United States Patent
Trudell

(10) Patent No.: US 9,202,316 B1
(45) Date of Patent: Dec. 1, 2015

(54) EMERGENCY VEHICLE CLIMATE APPARATUS AND METHOD

(71) Applicant: Continental Automotive Systems, Inc., Auburn Hills, MI (US)

(72) Inventor: Timothy John Trudell, Shelby Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/490,149

(22) Filed: Sep. 18, 2014

(51) Int. Cl.
*G07C 5/00* (2006.01)
*G05D 23/20* (2006.01)
*G05D 23/00* (2006.01)

(52) U.S. Cl.
CPC ........ *G07C 5/00* (2013.01); *G05D 23/00* (2013.01); *G05D 23/2024* (2013.01)

(58) Field of Classification Search
CPC ..... G05D 23/00; G05D 23/2024; G06F 19/00
USPC ............... 701/1, 36, 45, 49, 29.1, 29.2, 31.4, 701/31.5, 34.4; 340/438
See application file for complete search history.

(56) References Cited

U.S. PATENT DOCUMENTS

| | | | | |
|---|---|---|---|---|
| 4,852,469 A * | 8/1989 | Chuang | ........................... | 454/75 |
| 4,948,045 A * | 8/1990 | Romano | ........................ | 236/51 |
| 5,054,686 A * | 10/1991 | Chuang | ........................ | 236/49.3 |
| 5,330,385 A * | 7/1994 | Hotta et al. | ..................... | 454/75 |
| 6,161,071 A * | 12/2000 | Shuman et al. | ................. | 701/48 |
| 6,639,512 B1* | 10/2003 | Lee et al. | ...................... | 340/438 |
| 6,792,339 B2* | 9/2004 | Basson et al. | ..................... | 701/1 |
| 6,922,147 B1* | 7/2005 | Viksnins et al. | ........... | 340/573.1 |
| 6,930,614 B2* | 8/2005 | Rackham et al. | .......... | 340/686.1 |
| 7,170,401 B1* | 1/2007 | Cole | .............................. | 340/457 |
| 7,786,852 B2* | 8/2010 | Kautz | ........................... | 340/457 |
| 8,816,845 B2* | 8/2014 | Hoover et al. | ........... | 340/539.11 |
| 2003/0158644 A1* | 8/2003 | Basson et al. | ................... | 701/49 |
| 2005/0030188 A1* | 2/2005 | Flanagan et al. | .............. | 340/667 |
| 2010/0302022 A1* | 12/2010 | Saban | .......................... | 340/459 |
| 2013/0049955 A1 | 2/2013 | Hoover | | |
| 2014/0306838 A1* | 10/2014 | Beumler | ...................... | 340/988 |

\* cited by examiner

*Primary Examiner* — Thomas Tarcza
*Assistant Examiner* — Tyler J Lee

(57) ABSTRACT

At least one environmental parameter is received from at least one environmental sensor located in or at a vehicle. Based upon the at least one environmental parameter, a determination is made as to whether an abnormal condition exists within or at a vehicle. When the abnormal condition exists, at least one vehicle component is actuated until the abnormal condition no longer exists within the vehicle.

10 Claims, 11 Drawing Sheets

EMERGENCY VEHICLE CLIMATE APPARATUS AND METHOD

TECHNICAL FIELD

This application relates to maintaining acceptable climate conditions in a vehicle and, more specifically maintaining the conditions to avoid injury to vehicle occupants.

BACKGROUND OF THE INVENTION

Passengers of vehicles expect that the climatic conditions (e.g., temperature) within a vehicle will be maintained at comfortable (and safe) levels. Vehicles have heating and air conditioning systems that attempt to maintain these conditions at desired levels.

Unfortunately, conditions in a vehicle can sometimes become dangerous. The occupants (e.g., children) may be unable to take actions that alleviate these unsafe conditions. For examples, children are sometimes left in cars. The temperature in the car may rise to unsafe (and sometimes life threatening) levels.

Current approaches focus on alerting the driver (or some other authority) that an unsafe condition is occurring in the vehicle and that an occupant is in the vehicle. For instance, temperature sensors may measure the interior temperature of the cabin of the vehicle. If the temperature increases beyond a threshold safety value, a wireless transmission may be made to an emergency alert center and/or the vehicle owner to return to the vehicle and alleviate the unsafe conditions.

Such systems are dependent upon reliable wireless networks and proximity of individuals capable of entering the vehicle (i.e. have a key) and alleviating the temperature condition quickly. There was also some lag time between the time the transmission was made and the owner could return to the vehicle. This meant that harm could befall the occupant of the vehicle during this lag time even though the vehicle owner had been alerted.

BRIEF DESCRIPTION OF THE DRAWINGS

For a more complete understanding of the disclosure, reference should be made to the following detailed description and accompanying drawings wherein.

Figure 1:
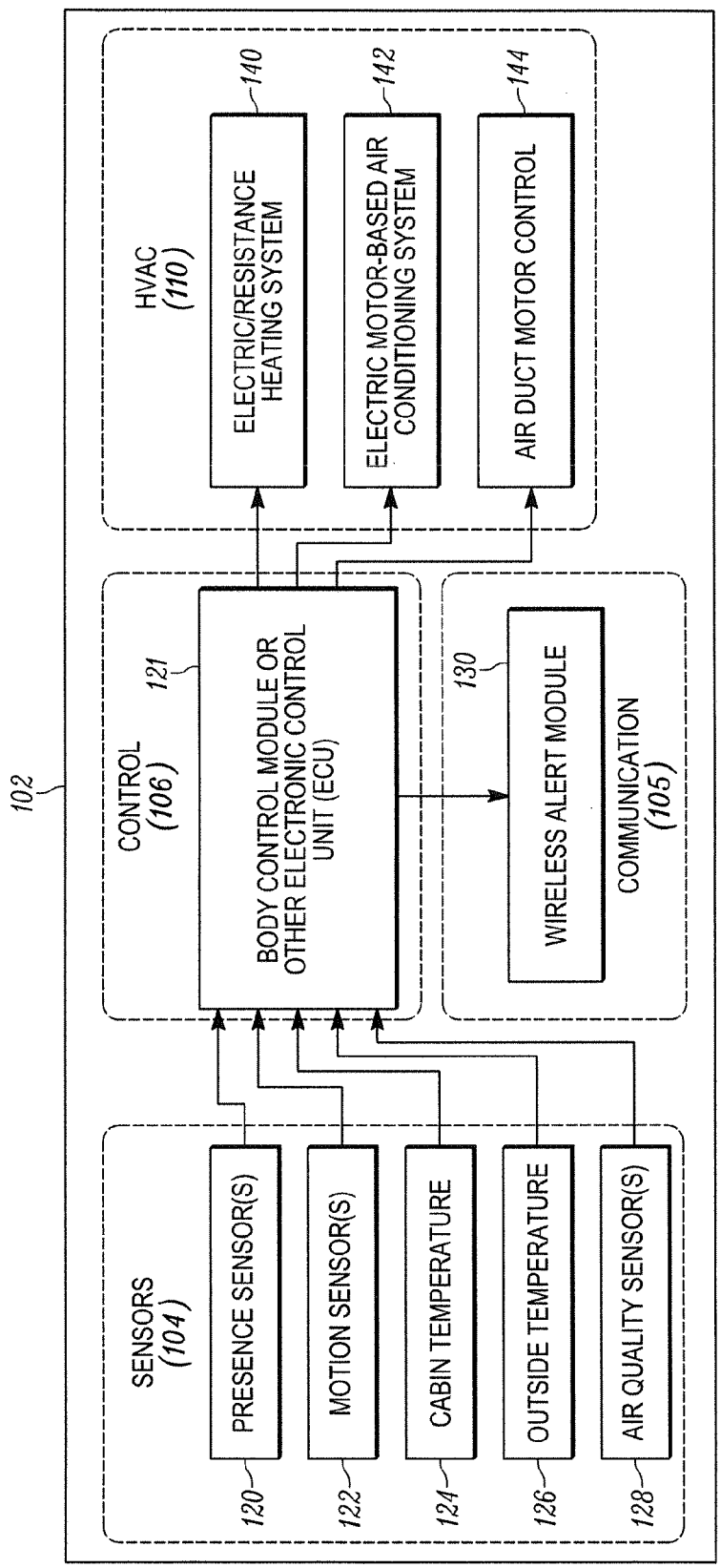
FIG. 1 comprises a block diagram of a safety apparatus according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are described herein that provide the ability to automatically enable HVAC systems (for heating or cooling) or other systems to alleviate unsafe operating conditions in a vehicle. These approaches are in many aspects performed autonomously at the vehicle, without the intervention of an absent driver or other third parties not at the vehicle. In other aspects, these approaches may utilize shared GPS data for contacting others that are located in close proximity to the vehicle when the unsafe operating conditions are determined.

In some examples, cabin temperature and occupancy monitoring is enabled upon driver exiting vehicle. Upon detection of passenger occupancy (and a predetermined temperature threshold is crossed), HVAC devices are selectively activated (e.g., providing heating or cooling in recirculation mode in the vehicle). Air quality monitors are also implemented (e.g. CO). For example, the vehicle could be in garage with internal combustion-based vehicles nearby.

In other aspects, repeated attempts are made to reach driver or programmed emergency contacts. This can be accomplished by attempting to communicate with an absent driver via a cellular phone network or the Internet to mention two examples. In some aspects, the present approaches actuate the HVAC devices until safe temperature limit is reached (or low battery voltage prevents operation).

It will be appreciated that there is no guarantee that a monitoring system can reach the driver (or anyone) via short-range wireless or cellular networks. There is also no guarantee somebody (e.g., a stranger) will respond to an alarm or even be close enough to hear. The present approaches provide the ability to automatically, autonomously (i.e., without third party control or intervention) enable HVAC systems (for heating or cooling) or other safety systems (e.g., those that detect CO levels) in a vehicle in order to restore safe conditions in the vehicle. Advantageously, the present approaches provide the potentially only life saving measures that can be performed in many circumstances.

In some examples, the present approaches switch from using a compressor to fan only at some voltage threshold to extend run time when cooling. In other examples, the present approaches implement a number of additional sensors to increase run-time/efficiency. For example proximity sensors, GPS sensors, or outside temperature sensors could be used to determine if vehicle is outside of a building and exchange with outside air is cool enough to use instead of air conditioning.

Flexibility in controlling environmental conditions in different vehicles is also provided. For instance and in sedans or large SUVs, ducts can be switched to increase airflow (and therefore evaporation of heat from skin) to specific location (e.g., the backseat or specific row).

If (for example) family members or other trusted individuals share GPS information, the present approaches attempt to contact those on an emergency contact list based on proximity (as indicated, for example, by a GPS sensor).

In others of these examples, the system is activated upon the driver exiting the vehicle. The system first checks for child car seat occupancy or other indications of movement/presence. Upon detection of passenger occupancy (and a predetermined temperature threshold is crossed) the HVAC system is activated (heating or cooling). Recirculation mode would be used to minimize external air intake. In addition, air quality monitors are enabled (e.g. CO detector). This is performed to ensure air safety (for example, vehicle could be in a garage with internal combustion-based vehicles nearby).

In other aspects, the present approaches make repeated attempts to reach driver or programmed emergency contacts. In still other aspects, the devices that are used to alleviate unsafe conditions are actuated until a safe temperature limit is reached; low battery voltage prevents operation; or the driver returns and corrects the condition or manually disables the system.

In many of these embodiments, at least one environmental parameter is received from at least one environmental sensor located in or at a vehicle. Based upon the at least one environmental parameter, a determination is made as to whether an abnormal condition exists within or at a vehicle. When the abnormal condition exists, at least one vehicle component is actuated until the abnormal condition no longer exists within the vehicle.

In some aspects, the abnormal condition comprises an unsafe condition for a vehicle occupant. In other aspects, the at least one environmental parameter may be a carbon dioxide level, a carbon monoxide level, humidity, or a temperature. Other examples are possible.

In yet other examples, an alert message is sent to the driver of the vehicle. In yet other examples, the vehicle component is a heater, an air conditioning unit, or a vent. Other examples are possible.

In other aspects, a determination is made as to whether the abnormal condition exists based upon an evaluation of multiple sensor readings. At least two of the multiple sensor readings confirm that an abnormal condition exists.

In other examples, outside air is circulated into the interior of the vehicle without actuating an air conditioning system. In still other examples, an air conditioning system is actuated without turning on the vehicle engine.

Referring now to FIG. 1, one example of a system based at a vehicle that automatically and autonomously provides safe operating conditions at the vehicle is described. A vehicle 102 includes sensors 104, a control module 106, a communication module 108, and heating ventilation and air condition (HVAC) devices 110.

It will be appreciated that the system consists of firmware, harnesses, vehicle busses, and hardware. Most electric/hybrid vehicles already implement some portion of this system. In the present approaches, a body control module 121 is provided. The vehicle body control module (or other electronic control unit (ECU)) 121 can be the location for hosting the algorithms required to implement the present approaches. That is, the hardware and/or software used to implement these approaches may be disposed at the module 121. In other aspects, electric or hybrid vehicles are particularly suited for these approaches as air conditioning can be enabled without a running motor. However, it will be appreciated that the present approaches are in no way limited to being used with electric or hybrid vehicles.

The sensors 104 include one or more presence sensors 120, one or more motion sensors 122, a cabin temperature sensor 124, an outside temperature sensor 126, and one or more air quality sensors 128.

The presence sensors 120 detect the presence of occupants in the vehicles. The motion sensors 122 detect the presence of motion by, for example, a vehicle occupant. The cabin temperature sensor 124 measures the temperature of the cabin in the interior of the vehicle. The outside temperature sensor 126 measures the outside air temperature external to the vehicle. The air quality sensors 128 measure the quality of the air in the interior (or the exterior) of the vehicle 102. For example, the sensors 128 may measure the presence of carbon dioxide or carbon monoxide to mention two examples. Other examples of sensors are possible.

As mentioned, the control module 106 may include a body control module 121 that receives sensor readings from the various sensors 104. After receiving the sensor values, it determines whether an abnormal or unsafe condition exists at the vehicle. When an abnormal or unsafe condition exists, the control module 106 actuates one or more of the HVAC devices to remedy the condition. In these regards, the control module may receive updated sensor values from the sensors. When the sensor values indicate the condition has returned to normal or to a safe condition, the control module 106 may de-actuate one or more of the HVAC devices 110. Alternatively some of the HVAC devices may be deactivated sequentially over time if the abnormal condition or unsafe condition has been partially relieved.

The communication module 108 may be actuated by the control module 106 to send a message to a user that an abnormal condition or an unsafe condition exists. The communication module 108 includes a wireless alert module 130. The wireless alert module 130 may have a processor that forms an alert message, and a transmitter that wirelessly transmits the message to the user or to other emergency personnel.

The heating ventilation and air condition (HVAC) devices 110 have the ability to change environmental parameters within or at the vehicle 102. The HVAC devices 110 include an electric/resistance heating system 140, an electric-motor-based air conditioning system 142, and an air duct motor control device 144. Other examples are possible.

The electric/resistance heating system 140 may be a heater of the vehicle that provides heat to the occupants of the vehicle. In one example, an electric-motor-based air conditioning system 142 provides cooled air to the occupants of the vehicle.

The air duct motor control device 144 controls the operation of the air ducts. For example, the device 144 may be used to facilitate the introduction of outside air into the interior of the vehicle.

In one example of the operation of the system of FIG. 1, at least one environmental parameter is received from one of the sensors 104 located in or at a vehicle. Based upon the at least one environmental parameter, a determination is made by the control module 106 as to whether an abnormal condition exists within or at a vehicle. When the abnormal condition exists, one or more of the vehicle components 110 are actuated until the abnormal condition no longer exists within the vehicle.

Figure 2:
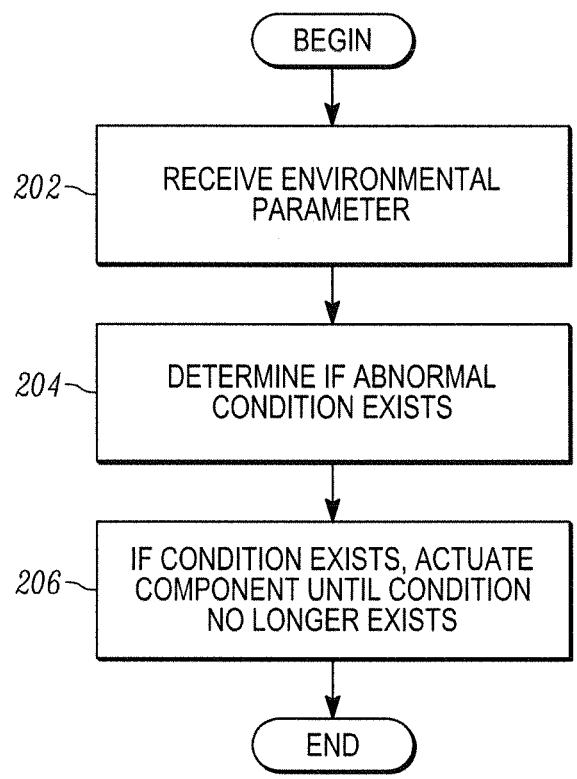
FIG. 2 comprises a flowchart showing the operation of a safety apparatus according to various embodiments of the present invention.

Referring now to FIG. 2, one example of an approach for providing safety features is described. At step 202, at least one environmental parameter is received from at least one environmental sensor located in or at a vehicle. At step 204, based upon the at least one environmental parameter, a determination is made as to whether an abnormal condition exists within or at a vehicle. For example, it may be determined whether one or more thresholds have been crossed. At step 206, when the abnormal condition exists, at least one vehicle component is actuated until the abnormal condition no longer exists within the vehicle.

Figure 3:
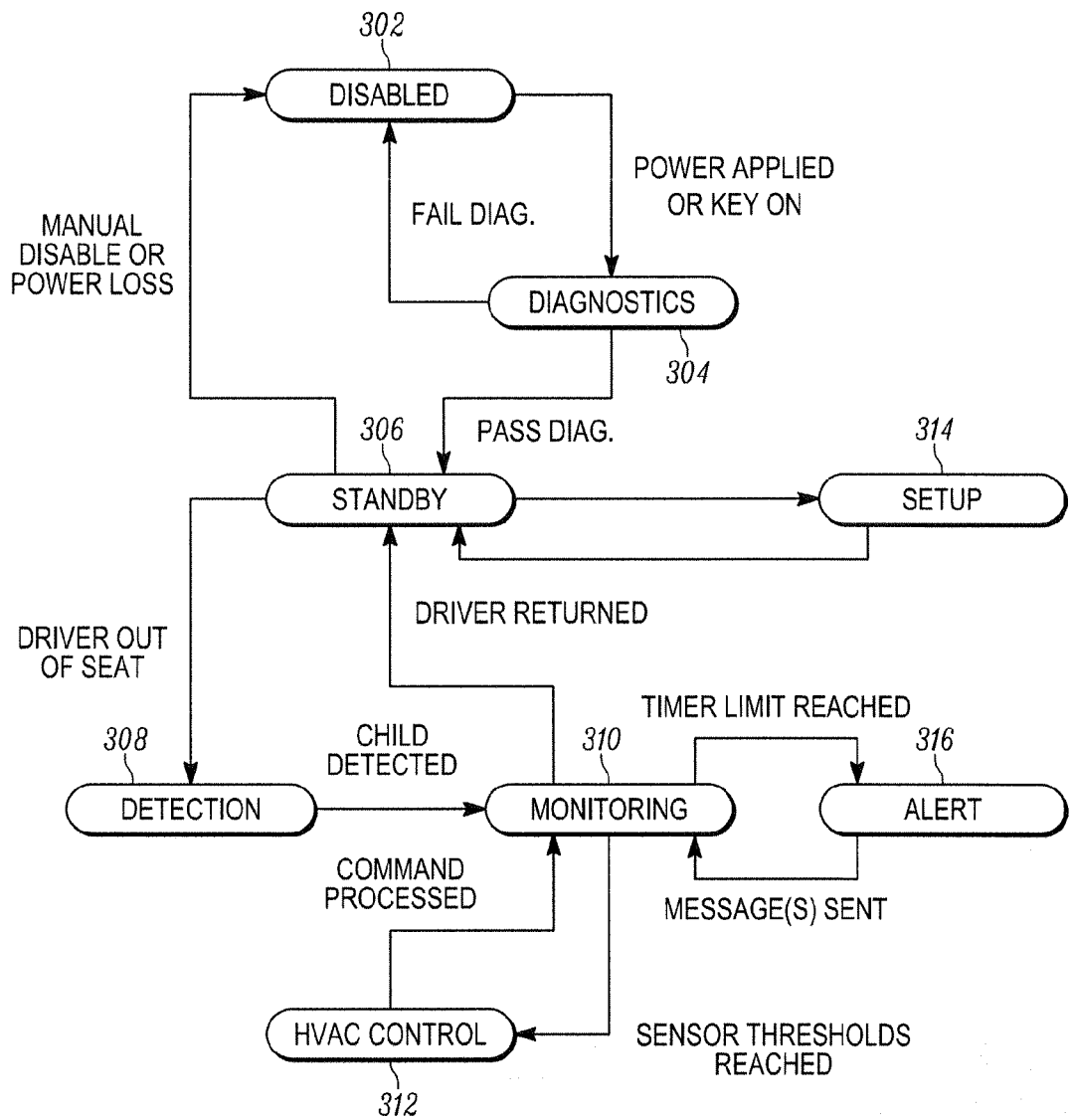
FIG. 3 comprises one example of a state transition diagram showing aspects of the operation of a safety apparatus according to various embodiments of the present invention.

Referring now to FIG. 3, one example of the operation of a safety system is described. The example of FIG. 3 shows a state machine with a disabled state 302, a diagnostics state 304, a standby state 306, a detection state 308, a monitoring state 310, an HVAC control state 312, an alert state 314, and a setup state 316. It will be appreciated that this is one example of a state transition diagram and that other examples are possible that include the same or different states.

In the disabled state 302, the system is in this state when vehicle power is insufficient for the system to function. In this instance, the system can either be completely non-operational or held in reset. The state is automatically entered if diagnostic routines detect an error. The state can also be manually entered for service purposes or when the driver makes a deliberate effort to do so.

In the diagnostics state 304, the system initially (and briefly) enters this state when vehicle power attains a minimum level for proper operation. The state can also entered by a user "key on" (or equivalent) event from the disabled state 302.

In the standby state 306, sensors indicate a driver is present. The system automatically enters this state from the diagnostics state 304 when diagnostic routines have completed with no errors. The state can also be entered by the driver returning to the vehicle (from the monitoring state 310).

In the detection state 308, the system automatically enters this state from the standby state 306 when the driver is determined to have left the vehicle. The purpose of this state is to continually survey the sensor fusion system for the detection of a child left unattended in the vehicle. When a child is detected, control passes to the monitoring state 310.

In the monitoring state 310, the closed-loop active control of vehicle cabin climate is performed for the primary purpose of alleviating excessively cold or hot temperatures that would be dangerous. Alternatively, with safe cabin temperatures, the system could also alleviate high concentrations of CO2 caused by lack of ventilation with a child (or children) present for extended periods. Control passes to the standby state 306 when the driver returns; to the alert state 314 when a timer limit is reached; or to the HVAC control state when a sensor threshold is reached.

In the HVAC control state 312, the heating, cooling, ventilation levels, and ventilation location operations as commanded by the monitoring state 310 are performed. Control returns to the monitoring state 310 when a command is processed.

The alert state 314 is periodically entered to transmit an alert via any available vehicular wireless methods available. The alerts can be in the form of text-based messages or audible via text-to-speech methods. The setup state 316 is entered by the user to define a prioritized list of email addresses or phone numbers to reach.

In another aspect and in the event somebody other than the driver is contacted, the setup routine should include make, model, color, model year, and license plate number. This aids easily and quickly finding the vehicle in areas such as in a large parking lot or garage.

Additionally, the vehicle could be programmed with user-specified options such as options to activate the light/horn when an emergency is detected. For example, if the driver often parks in an unsafe area, this option could be utilized.

Figure 4:
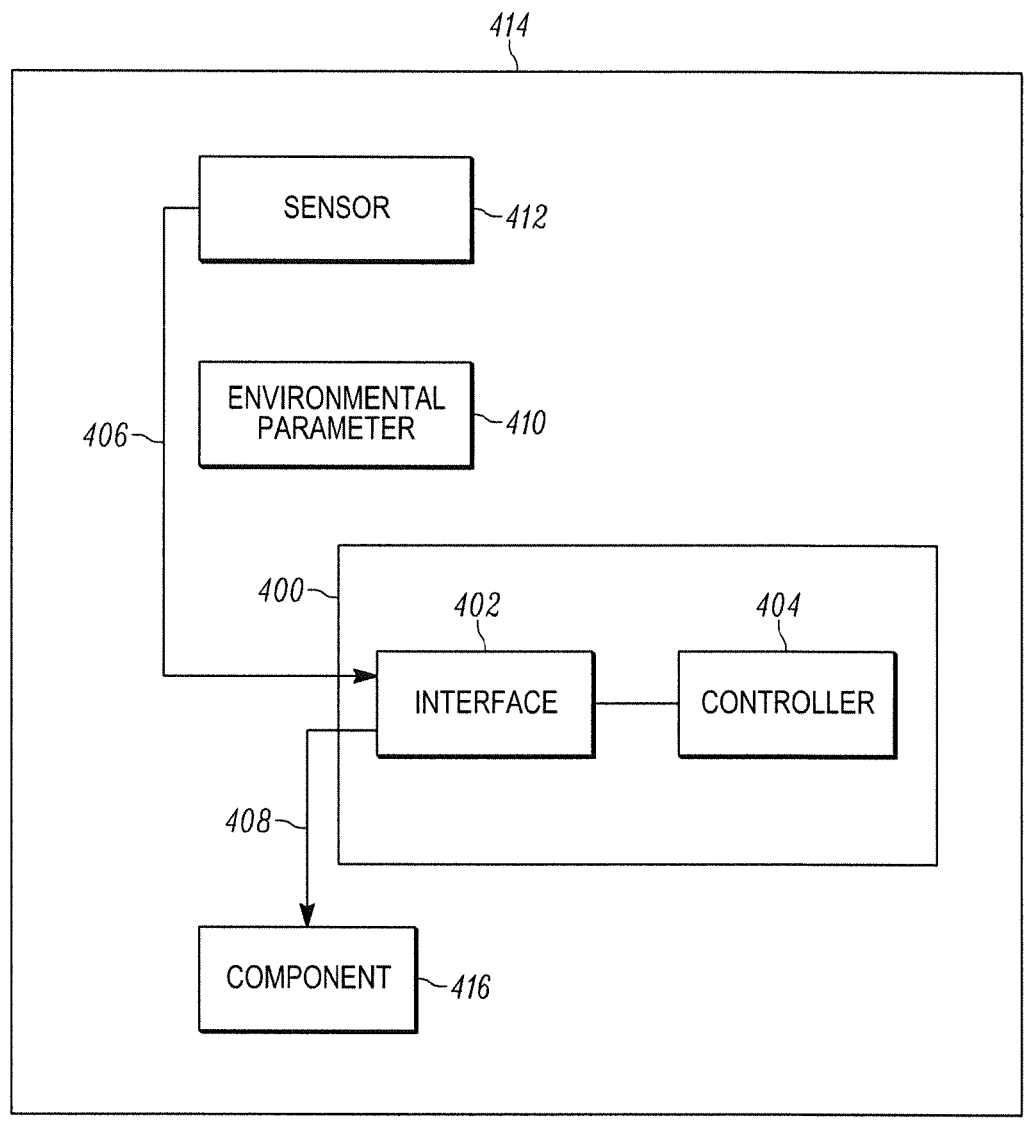
FIG. 4 comprises a block diagram showing a safety apparatus according to various embodiments of the present invention.

Referring now to FIG. 4, an apparatus 400 includes an interface 402 and a controller 404. The interface has an input 406 and an output 408. The input 406 is configured to receive at least one environmental parameter 410 from at least one environmental sensor 412 located in or at a vehicle 414.

The controller 404 is coupled to the interface 402. The controller 404 is configured to based upon the at least one environmental parameter 410, determine whether an abnormal condition exists within or at a vehicle 414. The controller 404 is configured to when the abnormal condition exists, actuate at least one vehicle component 416 via a control signal at the output 408 of the interface 402 until the abnormal condition no longer exists within the vehicle 414.

In some aspects, the abnormal condition comprises an unsafe condition for a vehicle occupant. In some examples, the environmental parameter may be a carbon dioxide level, a carbon monoxide level, or a temperature. Other examples are possible.

In other aspects, the controller 404 is configured to send an alert message to the driver of the vehicle via the output of the interface 402. In other examples, the vehicle component may be a heater, an air conditioning unit, or a vent. Other examples are possible.

In still other aspects, the controller 404 is configured to determine whether the abnormal condition exists based upon an evaluation of multiple sensor readings. At least two of the multiple sensor readings confirm that an abnormal condition exists. In other examples, the actuation of the at least one vehicle component causes outside air to circulate into the interior of the vehicle without actuating an air conditioning system. In still other examples, the actuation of at least one vehicle component includes actuating an air conditioning system without turning on the vehicle engine.

Referring now to FIGS. 5-11, examples of state flows are described when the system enters a particular state. It will be appreciated that these are examples only and that other examples are possible. It will also be understood that these states are interrelated, for example, by the relationship of FIG. 3.

Figure 5:
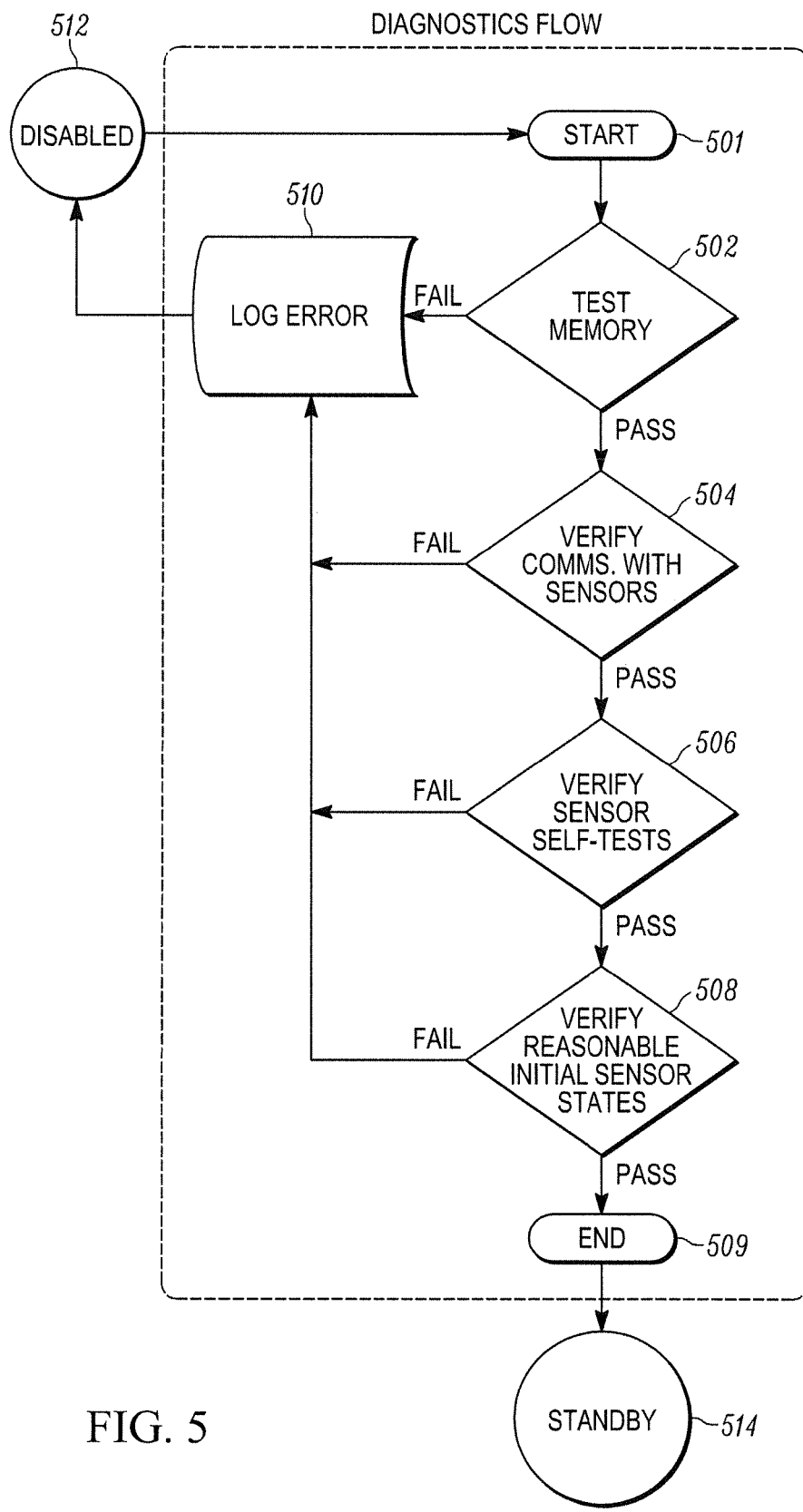
FIG. 5 comprises a diagnostics state flow diagram according to various embodiments of the present invention.

Referring now especially to FIG. 5, one example of diagnostics state flow is described. At step 501, the state is entered. At step 502, a test of memory is made to determine if there are any errors in memory. If step 502 fails, execution continues at step 510 where an error is logged and at step 512 a disabled state is entered. If step 502 passes, control continues with step 504.

At step 504, communication with the sensors is verified. If step 504 fails, execution continues at step 510 where an error is logged and at step 512 a disabled state is entered. If step 504 passes, control continues with step 506.

At step 506, self tests of the sensors are verified. If step 506 fails, execution continues at step 510 where an error is logged and at step 512 a disabled state is entered. If step 506 passes, control continues with step 508.

At step 510, reasonable initial sensor states are verified with the sensors. If step 508 fails, execution continues at step 510 where an error is logged and at step 512 a disabled state is entered. If step 508 passes, control continues with step 509 where the diagnostics state flow ends. Then, the system enters the standby state 514.

Figure 6:
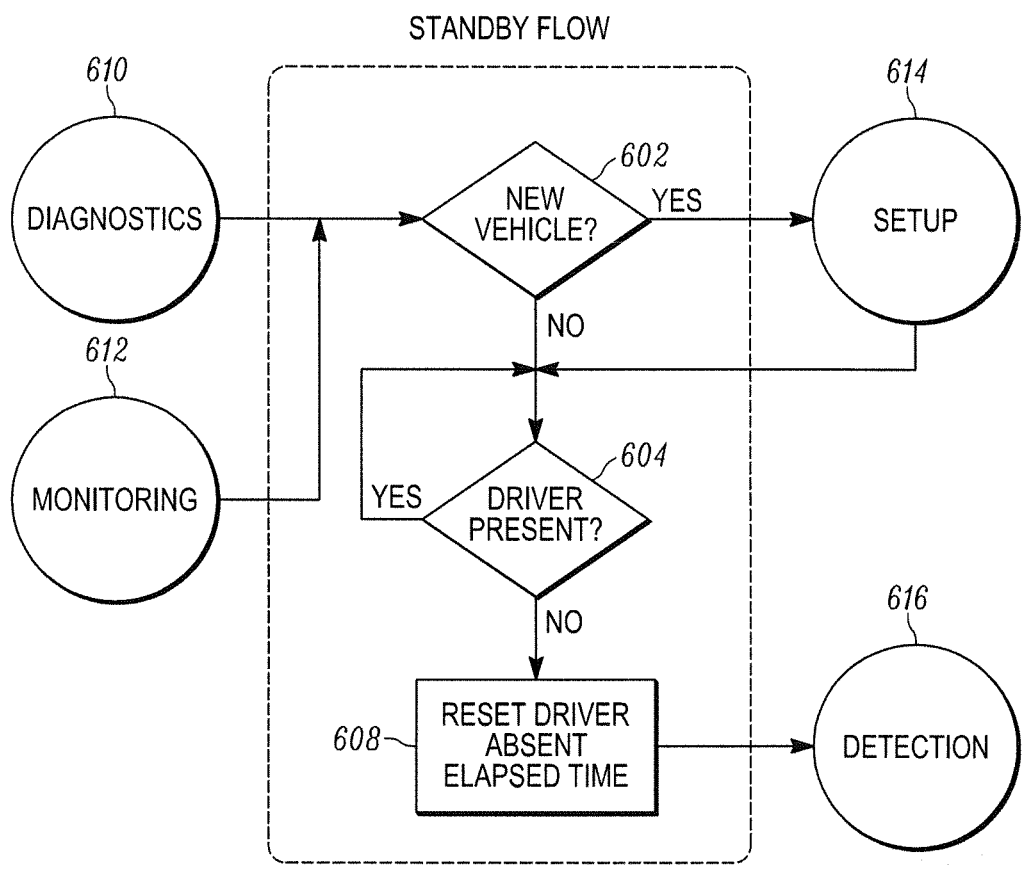
FIG. 6 comprises a standby state flow diagram according to various embodiments of the present invention.

Referring now to FIG. 6, one example of standby state flow is described. From a standby state 610 or a monitoring state 612, step 602 is executed. At step 602, it is determined if the vehicle is a new vehicle. If the answer is negative, control continues at step 604. If the answer is affirmative, a setup state 614 is entered. After exiting the setup state 614, execution continues at step 604.

At step 604, it is determined if a driver is present. The step is re-executed until a driver is not present when step 608 is executed. At step 608, the driver absent elapsed time is set and a detection state 616 is entered.

Figure 7:
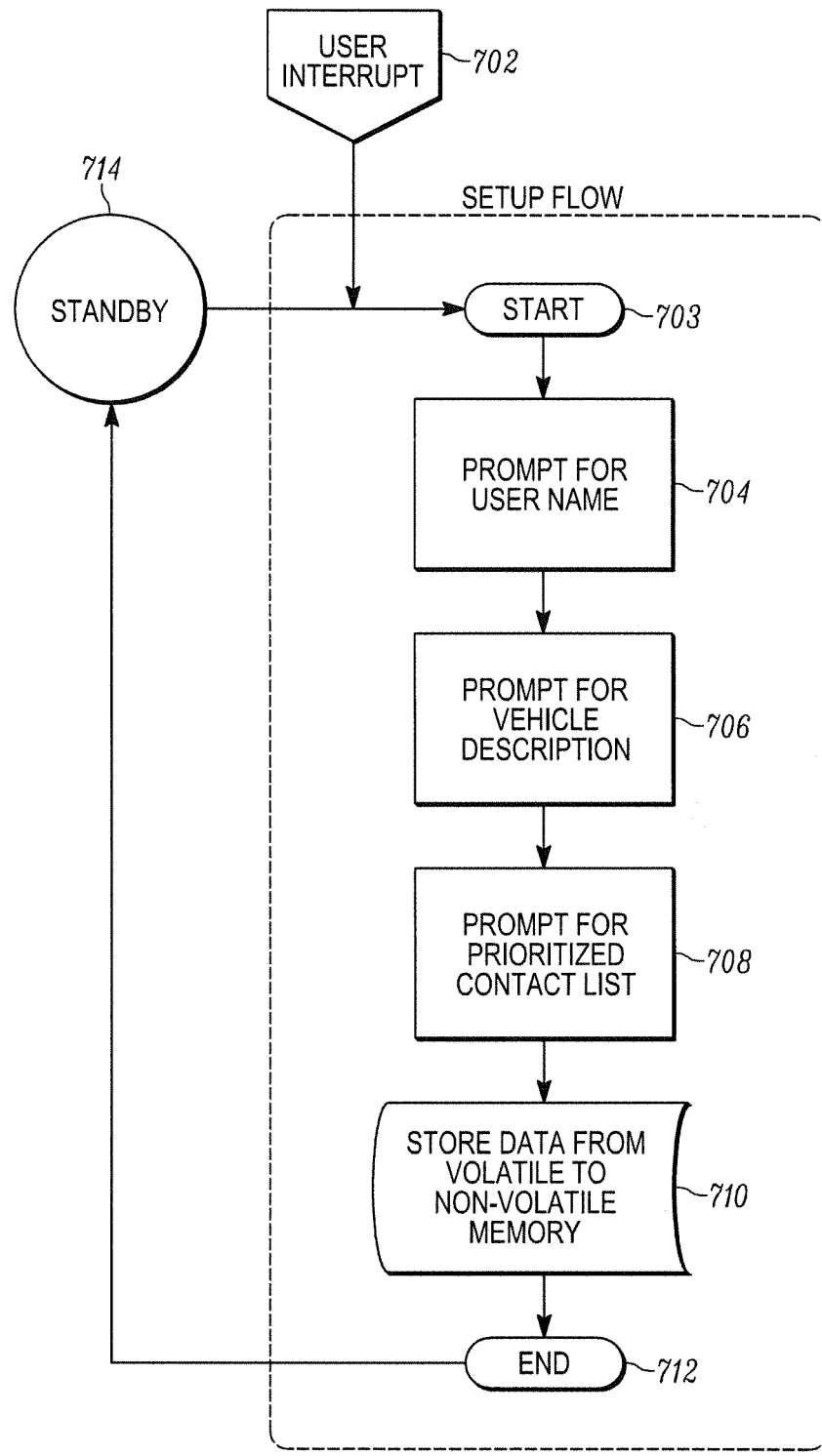
FIG. 7 comprises a setup state flow diagram according to various embodiments of the present invention.

Referring now to FIG. 7, one example of setup state flow is described. From a standby state 714 or a user interrupt 702, the setup state starts with step 703. At step 704, the user is prompted for a name. At step 706, the user is prompted for a vehicle description. At step 708, the user is prompted for a prioritized contact list. The prompts may be made via any interface device with any type of interface (e.g., a computer screen, a touch screen, and so forth).

At step 710, the data that was obtained (located in volatile memory) is moved into non-volatile memory. At step 712, execution ends.

Figure 8:
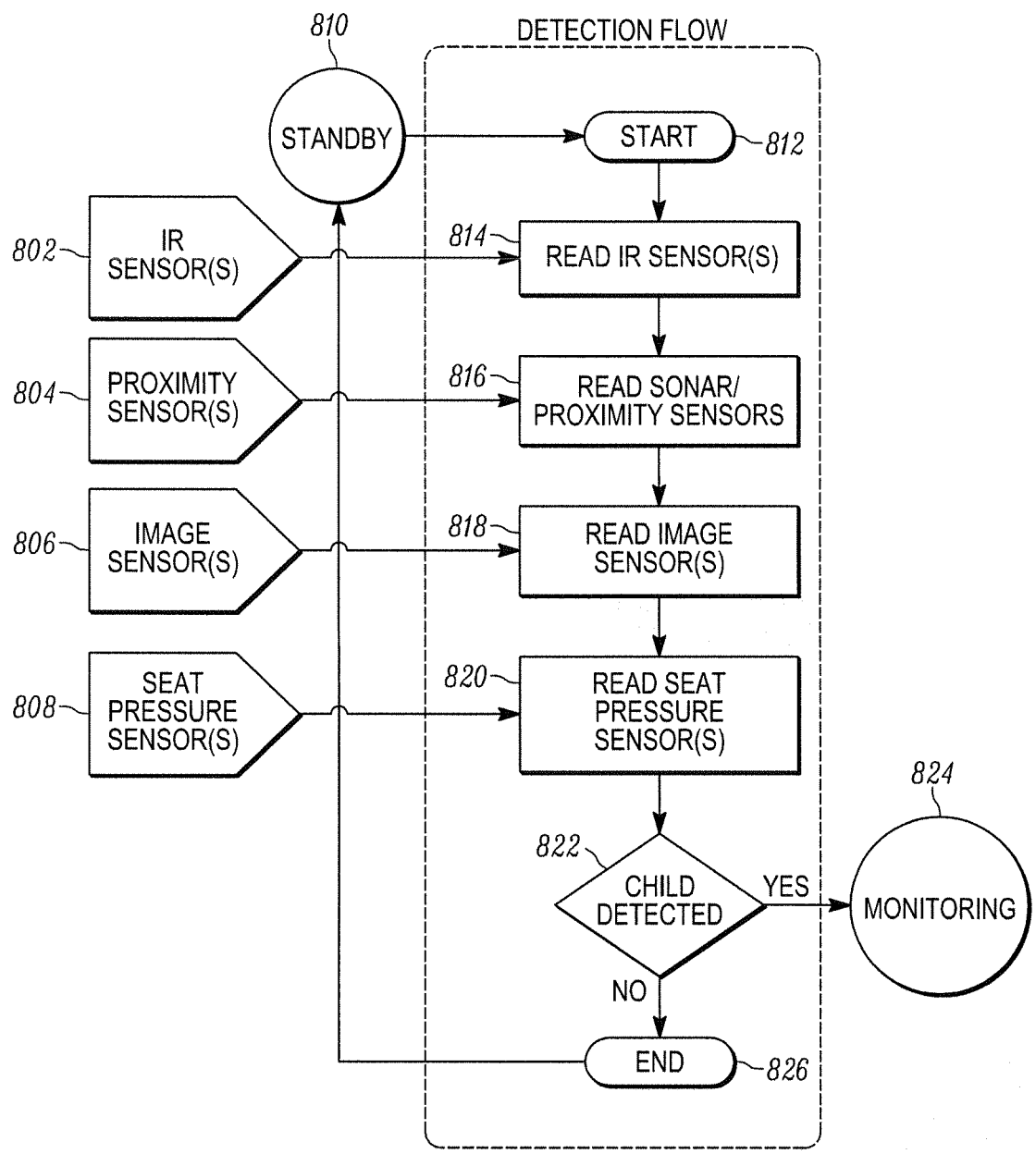
FIG. 8 comprises a detection state flow diagram according to various embodiments of the present invention.

Referring now to FIG. 8, one example of detection state flow is described. From standby state 810, the flow starts at step 812. At step 814, the IR sensors 802 are read. At step 816, the proximity sensors 804 are read. At step 818, the image sensors 806 are read. At step 820, the seat pressure sensors 808 are read.

At step 822, it is determined if a child is detected in the vehicle. If the answer is negative, execution ends at step 826 and a return is made to the standby state 810. If the answer is affirmative, the monitoring state 824 is entered.

Figure 9:
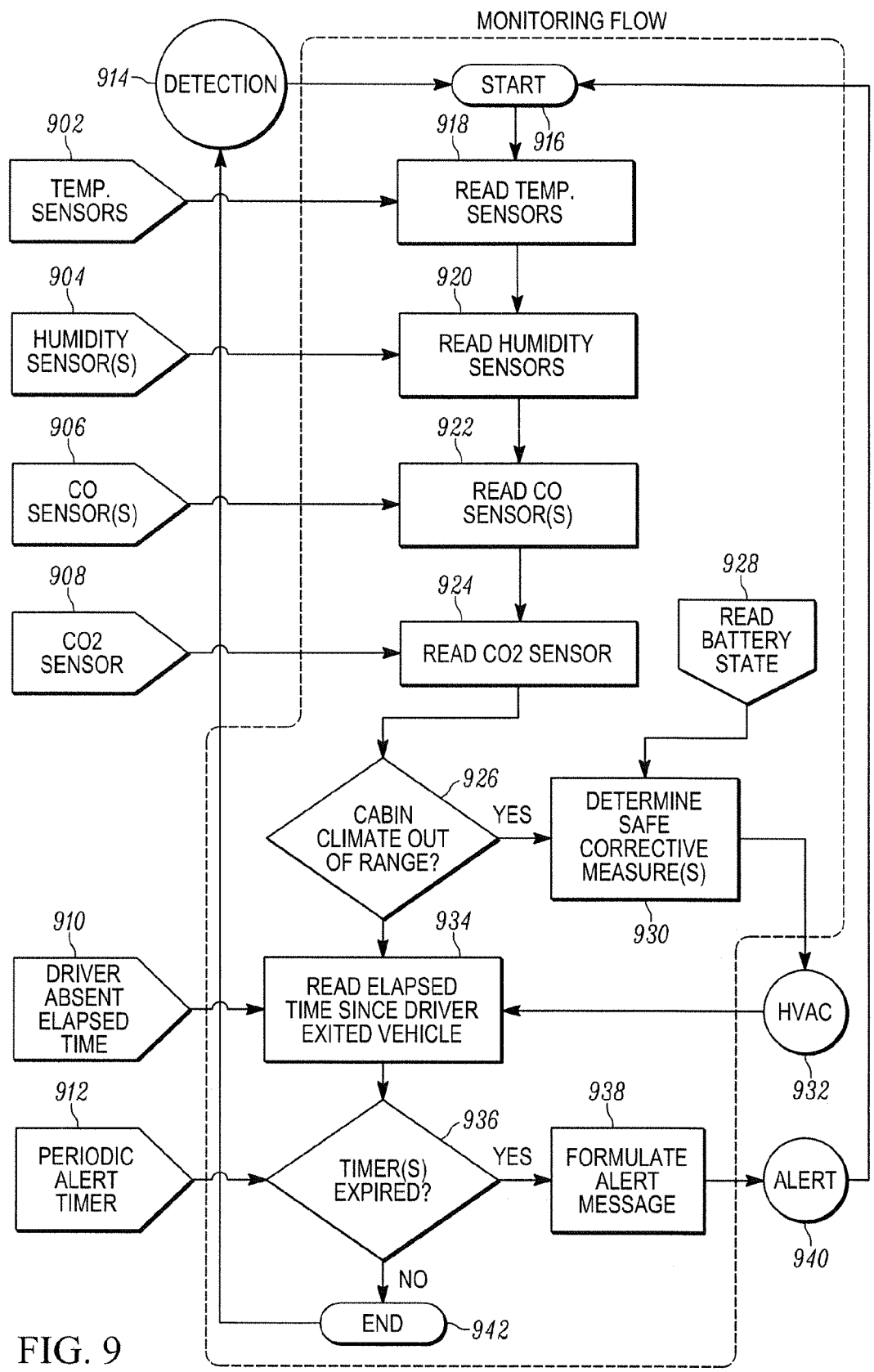
FIG. 9 comprises a monitoring state flow diagram according to various embodiments of the present invention.

Referring now to FIG. 9, one example of monitoring state flow is described. From detection 914, the flow starts at step 916. At step 918, the temperature sensors 902 are read. At step 920, the humidity sensors 904 are read. At step 922, the carbon monoxide (CO) sensors 906 are read. At step 924, the seat carbon dioxide sensors 908 are read.

At step 926, a determination is made as to whether the cabin of the vehicle has a climate that is out of range. If the answer is negative, execution continues with step 934. If the answer is affirmative, execution continues with step 930. Step 930 also receives battery state information 928 and determines safety or correction measures. HVAC state 932 is entered and from HVAC state 932, execution continues at step 934.

At step 934, the elapsed time since the driver exited the vehicle is read. At step 936, it is determined if the timers expired. If the answer is negative, execution ends at step 942 and the detection state 914 is reentered. If the answer is affirmative, at step 938 an alert message is formulated, and the alert state 940 is entered. After the alert state is complete, execution continues at the start step 916.

Figure 10:
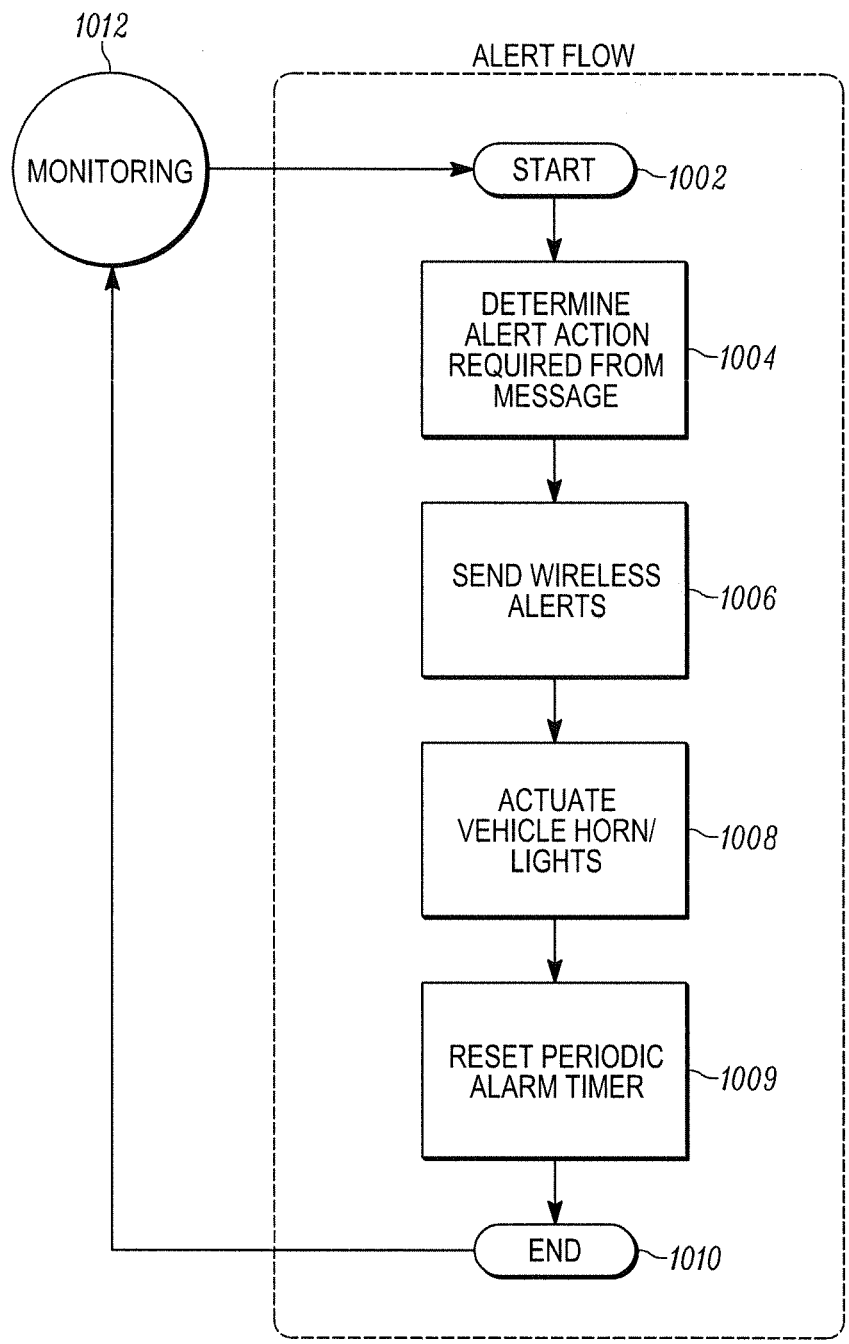
FIG. 10 comprises an alert state flow diagram according to various embodiments of the present invention.

Referring now to FIG. 10, one example of alert state flow is described. From the monitoring state 1012, the state starts at step 1002. At step 1004, alert actions are determined from the content of the alert message. At step 1006, wireless alerts are sent. At step 1008, the horn and/or lights may be actuated. At step 1009, the periodic alert timer is reset. Execution ends at step 1010 when execution returns to the monitoring state 1012.

Figure 11:
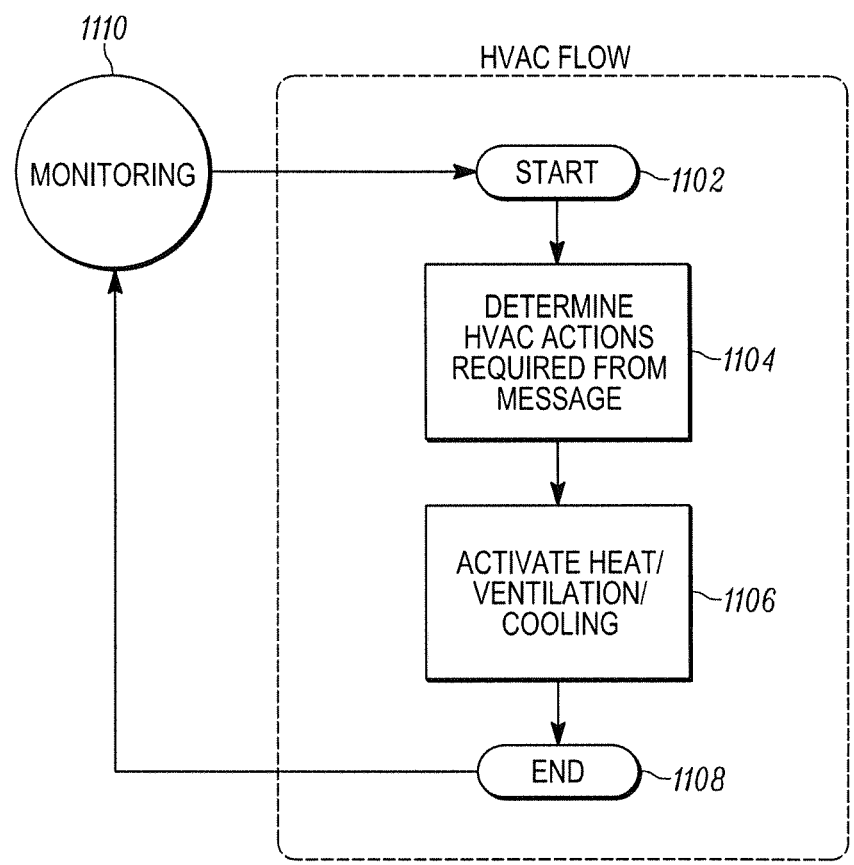
FIG. 11 comprises a HVAC state flow diagram according to various embodiments of the present invention.

Referring now to FIG. 11, one example of HVAC state flow is described. From the monitoring state 1110, the HVAC state starts at step 1102. At step 1104, HVAC actions are determined from the contents of the received message. At step 1106, HVAC heating and/or cooling actions are performed. Execution ends at step 1108 and then control returns to the monitoring state 1110.

It should be understood that many of the devices described herein (e.g., the controllers, the sensors, any presentation or display devices, or any external devices) may use an embedded computing device and/or ASICs to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a digital signal processor (DSP), a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or non-volatile memory elements (e.g., read only memory (ROM), EEPROM, Flash, and so forth). The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method, the method comprising:
receiving at least one temperature parameter from at least one temperature sensor and at least one air quality parameter from at least one air quality sensor located in or at an electric or hybrid vehicle;
determining whether the driver is in the electric or hybrid vehicle;
determining whether a child or other passenger is in the electric or hybrid vehicle;
based upon the at least one temperature parameter, determining whether an abnormal temperature condition exists within or at the electric or hybrid vehicle;
based upon the at least one air quality parameter, determining whether an abnormal air quality condition exists within or at the electric or hybrid vehicle;
when one or more of the abnormal temperature condition or the abnormal air quality condition exist, when the driver is not in the electric or hybrid vehicle, and when a child or other passenger is in the electric or hybrid vehicle, reaching a preliminary determination at a processing unit that a potential actionable abnormal condition exists at or within the electric or hybrid vehicle;
confirming at the processing unit that the potential actionable abnormal condition is an actual abnormal condition, the confirming based upon an evaluation of multiple sensor readings from the at least one temperature sensor and the at least one air quality sensor, at least two sensor readings being required to confirm that the actual abnormal condition exists;

when the actual abnormal condition is confirmed, at the processing unit enabling at least one vehicle component until one or more of the abnormal temperature condition and the abnormal air quality condition no longer exist within the vehicle;

at the processing unit, measuring the time since the driver has left the vehicle;

from the processing unit, sending an alert message to a party that is not the driver when the measured time exceeds a threshold.

2. The method of claim 1 wherein the at least one air quality parameter is a parameter selected from the group consisting of: a carbon dioxide level, and a carbon monoxide level.

3. The method of claim 1 wherein the vehicle component is a component selected from the group consisting of: a heater; an air conditioning unit, and a vent.

4. The method of claim 1 wherein actuating at least one vehicle component comprises circulating outside air into the interior of the vehicle without actuating an air conditioning system.

5. The method of claim 1 wherein actuating at least one vehicle component comprises actuating an air conditioning system without turning on the vehicle engine.

6. An apparatus, the apparatus comprising:

an interface with an input and an output, the input configured to receive at least one temperature parameter from at least one temperature sensor, at least one air quality parameter from at least one air quality sensor located in or at an electric or hybrid vehicle, a first indication as to whether the driver is in the electric or hybrid vehicle, and a second indication as to whether a child or other passenger is in the electric or hybrid vehicle;

a controller, the controller coupled to the interface, the controller configured to based upon the at least one temperature parameter, determine whether an abnormal temperature condition exists within or at the electric or hybrid vehicle, and to determine based upon the at least one air quality parameter, whether an abnormal air quality condition exists within or at the electric or hybrid vehicle, the controller configured to when one or more of the abnormal temperature condition or the abnormal air quality condition exist, when the first indication shows that the driver is not in the electric or hybrid vehicle, and when the second indication shows that a child or other passenger is in the electric or hybrid vehicle, reach a preliminary determination that a potential actionable abnormal condition exists at or within the electric or hybrid vehicle, the controller configured to confirm that the potential actionable abnormal condition is an actual abnormal condition, the confirmation based upon an evaluation of multiple sensor readings from the at least one temperature sensor and the at least one air quality sensor, at least two sensor readings being required to confirm that the actual abnormal condition exists, the controller configured to when the actual abnormal condition is confirmed, enable at least one vehicle component via the output until one or more of the abnormal temperature condition and the abnormal air quality condition no longer exist within the vehicle, the controller configured to measure the time since the driver has left the vehicle and send an alert message at the output to a party that is not the driver when the measured time exceeds a threshold.

7. The apparatus of claim 6 wherein the at least one air quality parameter is a parameter selected from the group consisting of: a carbon dioxide level, and a carbon monoxide level.

8. The apparatus of claim 6 wherein the vehicle component is a component selected from the group consisting of: a heater; an air conditioning unit, and a vent.

9. The apparatus of claim 6 wherein the actuation of the at least one vehicle component causes outside air to circulate into the interior of the vehicle without actuating an air conditioning system.

10. The apparatus of claim 6 wherein the actuation of at least one vehicle component includes actuating an air conditioning system without turning on the vehicle engine.

* * * * *